United States Patent
Singh

(10) Patent No.: US 10,270,661 B2
(45) Date of Patent: Apr. 23, 2019

(54) PASSIVE SAN DISCOVERY

(71) Applicant: EMC Corporation, Hopkinton, MA (US)

(72) Inventor: Chandan Singh, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 313 days.

(21) Appl. No.: 14/984,192

(22) Filed: Dec. 30, 2015

(65) Prior Publication Data
US 2016/0191330 A1  Jun. 30, 2016

(30) Foreign Application Priority Data
Dec. 30, 2014  (IN) .............................. 6704CHE2014

(51) Int. Cl.
| | | |
|---|---|---|
| G06F 15/16 | (2006.01) | |
| H04L 12/24 | (2006.01) | |
| H04L 29/08 | (2006.01) | |
| G06F 3/06 | (2006.01) | |

(52) U.S. Cl.
CPC .............. *H04L 41/12* (2013.01); *G06F 3/067* (2013.01); *H04L 67/16* (2013.01); *H04L 41/0213* (2013.01); *H04L 41/22* (2013.01); *H04L 67/1097* (2013.01)

(58) Field of Classification Search
CPC .......... H04L 41/12; H04L 67/16; G06F 3/067
USPC ........................................ 709/217, 219, 203
See application file for complete search history.

(56) References Cited

U.S. PATENT DOCUMENTS

| | | | | |
|---|---|---|---|---|
| 7,403,987 | B1* | 7/2008 | Marinelli | H04L 43/0817 707/999.202 |
| 8,826,032 | B1* | 9/2014 | Yahalom | H04L 43/0817 713/187 |
| 2005/0238353 | A1* | 10/2005 | McGlaughlin | H04L 49/357 398/45 |
| 2006/0235985 | A1* | 10/2006 | Ramkumar | H04L 63/102 709/229 |
| 2007/0073782 | A1* | 3/2007 | Nakatani | G06F 17/302 |
| 2008/0005507 | A1* | 1/2008 | Madnani | G06F 3/0607 711/161 |
| 2013/0132576 | A1* | 5/2013 | Haba | G06F 15/17306 709/225 |

* cited by examiner

*Primary Examiner* — Liang Che A Wang
*Assistant Examiner* — Kaylee J Huang
(74) *Attorney, Agent, or Firm* — Krishnendu Gupta; David Kuznick

(57) ABSTRACT

A method, system, and computer program product for managing a storage area network (SAN) comprising determining a plurality of resources within a SAN, the SAN comprising at least one or more host, a fabric and at least one or more arrays, wherein the at least one or more arrays further comprises a storage, determining a passive resource in the SAN, the passive resource identified from the plurality of resources comprising active resources and passive resources in the SAN, and displaying to a user virtual information of the SAN, wherein the virtual information includes the passive resource and attributes associated with the passive resource.

14 Claims, 4 Drawing Sheets

PASSIVE SAN DISCOVERY

RELATED APPLICATION

This application claim priority from Indian Patent Application Number 6704/CHE/2014 filed on Dec. 30, 2014 titled "Passive SAN Discovery" filed at the Office of the Controller General of Patents, Trademarks and Geographical Indicators at Chennai, India, the contents of which are herein incorporated by reference in entirety.

FIELD OF TECHNOLOGY

The disclosure relates to Storage Area Networks (SAN).

BACKGROUND

Data center environment sizes are currently exploding. Currently, there is an expectation that products will scale to existing data center environments. As storage area network (SAN) size and complexity increase, time and resources needed to configure, manage, and testing such SAN networks increases significantly.

SUMMARY

A method, system, and computer program product for managing a storage area network (SAN) comprising determining a plurality of resources within a SAN, the SAN comprising at least one or more host, a fabric and at least one or more arrays, wherein the at least one or more arrays further comprises a storage, determining a passive resource in the SAN, the passive resource identified from the plurality of resources comprising active resources and passive resources in the SAN, and displaying to a user virtual information of the SAN, wherein the virtual information includes the passive resource and attributes associated with the passive resource.

BRIEF DESCRIPTION OF THE DRAWINGS

Objects, features, and advantages of embodiments disclosed herein may be better understood by referring to the following description in conjunction with the accompanying drawings. The drawings are not meant to limit in any way the scope of the claims included herewith. For clarity, not every element may be labeled in every figure. The drawings are not necessarily to scale, emphasis instead may be placed upon illustrating embodiments, principles, and concepts. Thus, features and advantages of the present disclosure may become more apparent from the following detailed description of exemplary embodiments thereof taken in conjunction with the accompanying drawings in which:

Figure 1:
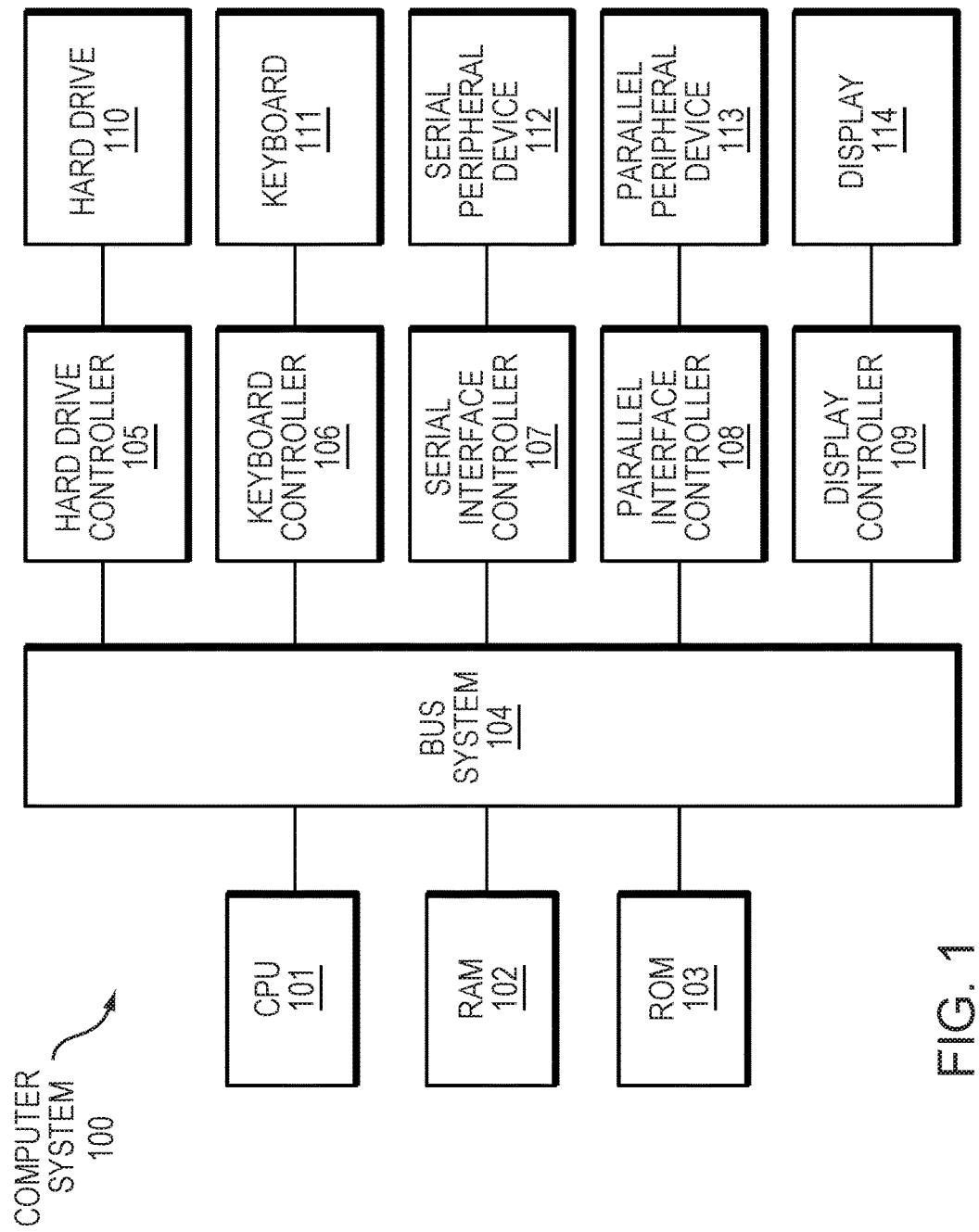
FIG. 1 schematically illustrates a block diagram of an exemplary computer system 100, in accordance with an embodiment of present disclosure.

It may be noted that the flowcharts and block diagrams in the figures may illustrate the apparatus, method, as well as architecture, functions and operations executable by a computer program product according to various embodiments of the present disclosure. In this regard, each block in the flowcharts or block diagrams may represent a module, a program segment, or a part of code, which may contain one or more executable instructions for performing specified logic functions. It should be further noted that in some alternative implementations, functions indicated in blocks may occur in an order differing from the order as illustrated in the figures. For example, two blocks shown consecutively may be performed in parallel substantially or in an inverse order sometimes, which depends on the functions involved. It should be further noted that each block and a combination of blocks in the block diagrams or flowcharts may be implemented by a dedicated, hardware-based system for performing specified functions or operations or by a combination of dedicated hardware and computer instructions.

DETAILED DESCRIPTION

Embodiments of the present disclosure may include a method, a system and a computer program produce for managing a storage area network (SAN), comprising determining a plurality of resources within a SAN, the SAN comprising at least one or more of a host, a fabric and at least one or more arrays, wherein the at least one or more arrays further comprises a storage, determining a passive resource in the SAN, the passive resource identified from the plurality of resources comprising active resources and passive resources in the SAN and displaying to a user virtual information of the SAN, wherein the virtual information includes the passive resource and attributes associated with the passive resource.

Some embodiments will be described in more detail with reference to the accompanying drawings, in which these embodiments of the present disclosure have been illustrated. However, embodiments of the present disclosure may be implemented in various manners, and the description should not be construed to a limitation of the embodiments disclosed herein.

Embodiments of the present disclosure may provide a method, a computer program product and an apparatus or system, which may ameliorate deficiencies related to managing a SAN environment, which may result in efficiently and effectively managing the SAN environment.

Embodiments of the present disclosure may relate to a system, a computer program product, an apparatus and a method for managing a storage area network (SAN). In some embodiments, a SAN environment may comprise a plurality of hosts, a fabric (one or more switches) and arrays (storage), the plurality of hosts may comprise a plurality of ports, and an array may comprise a plurality of ports. In certain embodiments, storage arrays may be configured for determining a plurality of passive resources in a SAN environment wherein passive resources may be physically present in the SAN environment. In some embodiments, passive resources in a SAN environment may not have been discovered previously. In certain embodiments, the current disclosure may enable discovering passive resources in a SAN environment. In some embodiments, the current disclosure may enable displaying to a user end-to-end virtual information of a SAN environment (hereinafter also referred to as SAN), wherein virtual information displayed to a user may include passive resources in addition to active resources.

In some embodiments, active resources may be physically present in a SAN environment and discovery may be made by using protocols such as Secure Shell (SSH), Simple Network Management Protocol (SNMP) and Storage Management Initiative (SMI).

In other embodiments, passive resources may be physically present in a SAN environment but may not have been discovered within the SAN environment, and a user therefore may not have been able to view information related to passive resources within the SAN environment.

In a further embodiment of the present disclosure, fabric in a SAN environment may comprise at least one or more switches, and each switch may comprise a plurality of ports.

In certain embodiments, a switch port may be coupled to a host bus adapter (HBA) port associated with a host; a host may be in a same SAN environment but separated from a fabric. In a further embodiment, a switch port may be coupled to an array frontend (AFE) port associated with an array, wherein an array may be in a SAN environment but may be separated from a fabric. In an embodiment there may be only one switch in a SAN, a switch may form a fabric and may take the role of a master switch. In alternative embodiments, there may be more than one switch in a fabric, in which case, one of the switches amongst a plurality of switches may take on the role of a master switch.

In a further embodiment, each host may be associated with one or more host ports, each host port may be associated with a unique HBA_Port_WWN (World Wide Name), and each array (storage) may be associated with one or more AFE ports, and each AFE port may be associated with a unique AFE_Port_WWN. In one embodiment, each array may further include a number of disks or other types of storage media.

In a further embodiment of the present disclosure, a fabric may contain or maintain a table of zoning information, which may be provided by an administrator of a SAN, and typically may be referred to as soft-zoning.

In a further embodiment, zoning information contained in a table may comprise a plurality of zones. In an embodiment, each zone amongst a plurality of zones may include a zone name and a plurality of zone members. In an embodiment, a zone name may be embedded in an encoded form a host name and an array name. In yet a further embodiment, each zone may be classified by an HBA_Port_WWN and an AFE_Port_WWN. In a further embodiment, a zone may include a one-to-one mapping between zone members, namely the zone name, an HBA_Port_WWN and the AFE_Port_WWN.

In a further embodiment of the present disclosure, an Internet Protocol (IP) address of a host may be obtained by parsing a zone name to obtain an IP address associated with a host. A further embodiment may include passing an IP address to a Domain Name System (DNS) server in order to obtain a host name. In yet a further embodiment, each zone member may be decoded, to obtain passive HBA information and passive AFE information. In a further embodiment, a passive hostname, a passive HBA and passive AFE information may be displayed in an end-to-end virtual environment to a user.

In yet a further embodiment of the present disclosure, an array may include storage, such as an intelligent storage system or a box. In certain embodiments, the present disclosure may improve managing and configuring a SAN environment and may improve the efficiency and security for configuration and management of a SAN.

Reference is now made to the example embodiment of FIG. 1, which illustrates an exemplary computer system 100 in accordance with an embodiment of the present disclosure. As illustrated in FIG. 1, computer system 100 includes: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 is coupled to System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as illustrated in FIG. 1 may be only for exemplary purposes rather than any limitation to the present disclosure. In some cases, some devices may be added to or removed from the computer system 100 based on specific situations.

Typically a SAN environment consists of a number of resources. In an embodiment, each of these resources in a SAN environment may be either an active resource or a passive resource. In an embodiment, active resources in a SAN may be easily identified and presented to an end-user. In an example embodiment, this may be done using a software management tool. Conventionally, however, there may be difficulty in providing an end user an end-to-end visualization of all resources in a SAN, which may include all active resources and passive resources in a SAN. Typically, it may be problematic to provide a visualization of passive resources in a SAN. Embodiments of the present disclosure may include a method, a computer program and a system or apparatus to identify passive resources in a SAN environment and may provide an end-to-end visualization of all resources, which may include a list of passive resources to an end user. In an example embodiment, a software management tool may be used to provide an end-to-end visualization.

Figure 2:
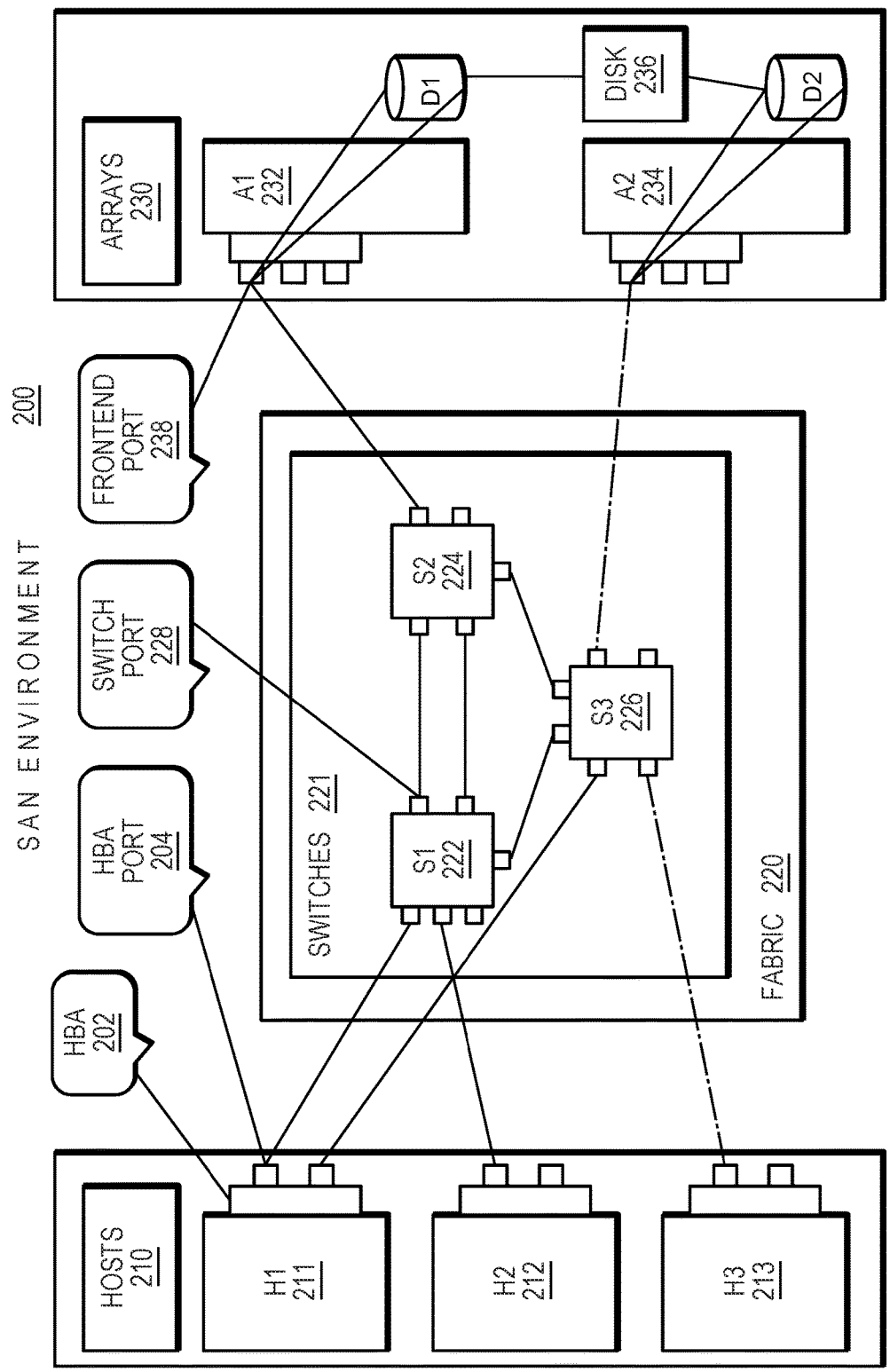
FIG. 2 is an exemplary architecture of a SAN environment 200 in accordance with an embodiment of present disclosure.

Reference is now made to FIG. 2, which illustrates an exemplary architecture of a SAN 200 in accordance with an embodiment of the present disclosure. SAN environment 200 includes Hosts 210, fabric 220 and Arrays 230. Each host amongst the plurality of hosts consists of Host Bus Adapter (HBA) 202 and each HBA includes one or more HBA ports 204. Host 210 includes a plurality of hosts illustrated as H1 211, H2 212, H3 213. SAN 200 also consists of fabric 220. Fabric 220 consists of a number/plurality of switches 221. Fabric 220 also has physical switches. Amongst the physical switches that are in fabric 220, one of the many physical switches is enabled to be assigned to be a master switch. As illustrated in FIG. 2, fabric 220 includes three switches S1 222, S2 224 and S3 226. Switch S3 226, which is one of the three physical switches in the fabric may be assigned to be the master switch, and switch S3 226 is configured to store zoning information and other intelligence related to fabric 220. SAN environment 200 may also comprise Arrays 230, which include storage A1 232, A2 234.

As illustrated in FIG. 2, the solid lines are indicative of active resources in the SAN and the dotted lines are be indicate passive resources in the SAN environment.

In a further embodiment, there may be other elements (hardware/software/firmware) within a SAN environment. In many embodiments, hosts may be an exemplary the computer systems as illustrated in FIG. 1, or may be another computing device having a processor and a memory that is attached to a SAN such as a laptop computer, a PDA, a tablet, a mobile phone etc.

In many embodiments, there may be a number of hosts in a given SAN environment. In one embodiment, each host, may be running/executing an operating system, and each of these hosts in a SAN may be executing (hereinafter also referred to as running/active) on a different operating system.

In some embodiments, the operating system executed by the host may be specific to a host. In the embodiment of FIG. 2, for example host H1 211 may be running on a WIN-DOWS® operating system, host H2 212 may be running on a LINUX® operating system, Host H3 213 may be running on a SOLARIS® operating system. In other embodiments, other hosts in a San may be running on different embodiments such as AIX®, MAC OS®, or iOS®.

In one embodiment, one or more of the hosts amongst a plurality of hosts may be running on a same operating system, i.e., there may be multiple hosts running a same operating system in a SAN. As an example only a few operating systems have been listed here, and this should not be considered as a limitation on the embodiments of the present disclosure, because hosts may include a variety of systems (either mentioned above or not mentioned herein) running on a variety of operating system (either mentioned above or not mentioned herein).

In some embodiments, a host controller or host adapter or host bus adapter (HBA) may be used to connect a host system (the computer) to other devices and/or storage devices in a network, i.e., SAN environment. In certain embodiments, a host bus adapter may be used for referring to devices for connecting a SCSI, a Fibre Channel, an eSATA, and other such devices. However, in some other embodiments, devices for connecting to an IDE, an Ethernet, a FireWire, and other systems may also be referred to as host adapters.

In some embodiments, the term network interface controller (NIC) may be more often used for devices connecting to computer networks, while in other embodiments the term converged network adapter may be applied when protocols such as an iSCSI or a Fibre Channel over Ethernet allow storage and network functionality over a same physical connection.

In certain embodiments, a HBA may be generally a circuit board and/or integrated circuit device that may be configured to provide input/output (I/O) processing capabilities and physical connectivity between a server and a storage device. In other embodiments, because a HBA relieves a host microprocessor of both data storage and retrieval tasks, it may be known to improve the server's performance time. In certain other embodiments, a HBA and its associated disk subsystems may be sometimes referred to as a disk channel. In certain other embodiments, a HBA associated with a host may have a unique World Wide Name (WWN), and a WWN may be similar to an Ethernet MAC address. Typically, a WWN uses an Organizationally Unique Identifier (OUI), which may be a 24-bit number that uniquely identifies a vendor, manufacturer, or other organization, globally or worldwide. In certain embodiments, a WWN may be a standard that is assigned by IEEE. In an embodiment, WWNs assigned to hosts may be longer, for example a WWN for a host may be 8 bytes. In certain embodiments, an HBA may be of two types; a node WWN (WWNN), which may be shared by all ports on a HBA, and a port WWN (WWPN), which may be unique to each port. In certain embodiments, HBA models may have different operating speeds for example 1 Gbit/s, 2 Gbit/s, 4 Gbit/s, 8 Gbit/s, 10 Gbit/s, 16 Gbit/s and 20 Gbit/s.

In one embodiment, a fabric may be a logical term for a collection/plurality of physical switches and the fabric may be designed to perform the role of a container for all switches. In certain embodiments, a master switch may contain zoning information and other intelligence that belong to all other physical switches and itself in a fabric.

In other embodiments, if a switch in a fabric is assigned as a master switch, the master switch may contain all zone information and other related information for the fabric.

In one exemplary embodiment, if a fabric contains one switch, then that single switch may be designated as a master switch in a SAN. In certain other embodiments, a fabric may comprise a plurality of switches and one of the switches from a plurality of switches present in a fabric may take on the role of a master switch. In an exemplary embodiment, if a switch may be considered to be a master switch then all other switches in the fabric may in turn be designated as slave switches, and zoning information for a SAN may be contained in a master switch. In one embodiment, each switch in a fabric amongst a plurality of switches may have a plurality of switch ports.

In certain embodiments, arrays may be coupled with disks at a back end. In a further embodiment, each array in a SAN may have an associated Array Front End Ports (AFE_Port).

In some embodiments, each HBA port may be mapped to at least one switch port. In a further embodiment, switch ports amongst a plurality of switches may be interlinked. Again in some other embodiments, each array front end port of an array may similarly be coupled to a switch port.

Exemplary embodiments of the present disclosure may relate to identifying basic array and host HBA information without active array and HBA discovery. In some embodiments, passive resource or passive array discovery may be based on zoning information present in a fabric. In some other embodiments, zoning information may be provided in a fabric by a SAN administrator or a user who has administrative privileges to a SAN, and such a technique of providing zoning information may be referred to as softzoning. In some other embodiments, zone information may contain a number of zones or zone records. In certain embodiments, zone information may be present in zone records. In certain other embodiments, zone members may be first obtained. In some other embodiments, zone members may comprise the following: a host HBA port, a WWN or an array front end (AFE) port WWN. In a further embodiment, zone members may be a Port WWN either from host or array. In accordance with embodiments of the present disclosure, Port WWN may be unique in a SAN and a Port WWN may be decoded to obtain HBA and Array Information. In some other embodiments, each vendor/provider of devices in a SAN may have a different algorithm for decoding and encoding a Port WWN and such algorithms may be vendor specific. In some other embodiments, after obtaining zone members, from information present therein in zone members, array front end port (AFE port) or host HBA port (HBA port) may be identified, which may be done by applying a suitable algorithm or a methodology that is known in the art. In some other embodiments, an algorithm for decoding may be provided by a Vendor depending on an array that may be in use and information regarding a HBA port and an array port may be obtained. In accordance with some other embodiments of the present disclosure, by decoding zone members from zoning information; passive array, and passive HBA may be discovered/obtained.

In some embodiments of the present disclosure, zoning information may also contain/include zone names. In an example embodiment, a zone name may be labelled as Z-H1-A1, wherein H1 may refer to a particular host and A1 may refer to a particular array. In some other embodiments, zone names may be parsed and a host name associated with a host may be obtained. In certain embodiments, a host name may be mapped with a DNS and an IP address of a host may be obtained/retrieved. In some other embodiments, once an IP address is obtained, end users may be provided with an end-to-end virtual information (indicating all information associated with the passive resource) of all passive resources i.e. a host to array path of all passive resources without inclusion of any active host and active array. In one embodiment, information may be displayed to a user by means of a software visualization tool, which may list a passive host, an associated passive HBA information and an associated passive array information separately.

As an exemplary embodiment, a fabric may contain zone information and for creating a zone "AAA", and illustrates a recommendation in one format as shown below in Table 1.

TABLE 1

| Zone Name | Host HBA Port WWN | Array Port WWN |
|---|---|---|
| Z_hostname (Z_AAA) | 10:00:00:00:c9:22:fc:01 | 50:06:04:81:D6:F3:45:42 |

In some embodiments, identifying a passive host may be performed using a zone name "Z_hostname." In a particular embodiment, consider an exemplary hostname "Z_AAA," wherein a host name may be extracted. In this embodiment, a host name may be extracted from a zone name by parsing the zone name, and then using a domain name server (DNS), an associated host IP address of a host may be obtained. In a further embodiment, a check may be subsequently performed in real time as to whether a host name may be pinged or not, using a normal ping command, for example to ensure authenticity of a host.

In a certain embodiment, identifying a passive HBA OR Array may be performed. In further embodiments, other methods of performing these identifications may fall within the scope of the embodiments of the present disclosure. In an embodiment, a Port WWN may uniquely define a SAN, and a port WWN may be decoded, using vendor specific algorithms or techniques, in order to obtain HBA and Array Information. In a specific embodiment, each vendor may have different proprietary algorithms for decoding and encoding a port WWN. In another specific embodiment, a user specific generic algorithm may also be used for the process of encoding and decoding.

In certain embodiments, devices on a SAN may be uniquely identifiable, which ensure that data transmission occurs between a correct source and target device across a SAN fabric or loop. In certain other embodiments, in an Ethernet environment, devices may be uniquely identified by their MAC (media access control) address. In some embodiments, within a SAN, a HBA and other devices in the SAN may utilize a unique identifier. In other embodiments, codes may be interpreted to ensure that when cabling SAN infrastructures, connected devices may be correctly identified and validated so that cabling may be performed in a correct manner. In a given embodiment, a SAN equivalent of a MAC address may be referred to as the worldwide name (WWN) or WWPN (Worldwide Port Name) or WWNN (Worldwide Node Name). In certain other embodiments, a WWPN may be the name that may be more likely to be in use. In a further embodiment, WWPN may be a name that a HBA may present while logging into a SAN fabric. In certain embodiment, Worldwide Names may consist of 16 hexadecimal digits grouped as 8 pairs, and may be written with a colon characters separating each pair. Some examples embodiments of some WWN pattern are shown below:

50:06:04:81:D6:F3:45:42 (EMC disk subsystem)
10:00:00:00:c9:22:fc:01 (Emulex HBA card)
21:00:00:e0:8b:05:05:04 (Qlogic HBA card)
50:06:0e:80:05:61:c0:10 (Hitachi System)
50:05:07:63:00:c7:01:99 (IBM System)

In certain embodiments, a format for WWN may be defined by IEEE, and a specific format of a WWN may be defined by a Name Address Authority field value, which may be a first digit of a WWN. In some embodiments, the following values may be used for defining a name address authority field value:

Bit 1—IEEE 803.2 standard 48 bit ID
Bit 2—IEEE 803.2 extended 48-bit ID
Bit 5—IEEE Registered Name
Bit 6—IEEE Extended Registered Name In an example embodiment, consider the EMC Symmetrix VMAX/DMX SAN environment. In this embodiment, vendors may use IEEE definition for a port WWN definition. In this embodiment, for Symmetrix VMAX/DMX, EMC may use "IEEE extended 64-bit ID" for its port WWN definition. In this embodiment, a 64-bit Port WWN may have identification as 5000097808136198. In this example embodiment, in step 1, first 36 bits WWN of a 64 bit port WWN given above may be populated into binary format as shown in Table 2 below. In Table 2, Bit 63-36 i.e. value 50000097 may be recognized to be a vendor specific unique identification (UID) for a Symmetrix V-Max.

TABLE 2

| | Bits | | | | | | | | | | | | | | | | | | | |
|---|---|---|---|---|---|---|---|---|---|---|---|---|---|---|---|---|---|---|---|---|
| | 35 | 34 | 33 | 32 | 31 | 30 | 29 | 28 | 27 | 26 | 25 | 24 | 23 | 22 | 21 | 20 | 19 | 18 | 17 | 16 |
| 5000097 | 8 1000 | | | | 0 0000 | | | | 8 1000 | | | | 1 0001 | | | | 3 0011 | | | |
| | Bits | | | | | | | | | | | | | | | | | | | |
| | 15 | 14 | 13 | 12 | 11 | 10 | 9 | 8 | 7 | 6 | 5 | 4 | 3 | 2 | 1 | 0 | | | | |
| 5000097 | 6 0110 | | | | 1 0001 | | | | 9 1001 | | | | 8 1000 | | | | | | | |

In step 2 of the example embodiment, a binary output to bit cell may be populated as shown in Table 3 below. In this example embodiment, each bit or combination of bits in Table 3 may have its own significant meaning, which has been provided in Table 3 for sake of clarity.

again, and it may be concluded/deduced that bit 25 to 10 may have an associated value of 0000010011011000. In this embodiment, binary value for an associated value may be

TABLE 3

| | Bits | | | | | | | | | | | | | | | |
|---|---|---|---|---|---|---|---|---|---|---|---|---|---|---|---|---|
| | 35 | 34 | 33 | 32 | 31 | 30 | 29 | 28 | 27 | 26 | 25 | 24 | 23 | 22 | 21 | 20 |
| 5000097 | | 8 | | | | 0 | | | | | 8 | | | | 1 | |
| | | 1000 | | | | 0000 | | | | | 1000 | | | | 0001 | |
| | 1 | 0 | 0 | 0 | 0 | 0 | 0 | 0 | 1 | 0 | 0 | 0 | 0 | 0 | 0 | 1 |
| | Origine: | Origine: | Origine: | | Cross Refer: Chart-1 | | | | | Calculate from BIN to DEC | | | | | | |
| | CN, SN: | EU, SN: | US, SN: | | | | | | | | | | | | | |
| | CN49xxxxxxx | CK29xxxxxxx | HK19xxxxxxx | | | | | | | | | | | | | |

| | Bits | | | | | | | | | | | | | | | |
|---|---|---|---|---|---|---|---|---|---|---|---|---|---|---|---|---|
| | 19 | 18 | 17 | 16 | 15 | 14 | 13 | 12 | 11 | 10 | 9 | 8 | 7 | 6 | 5 | 4 | 3 | 2 | 1 | 0 |
| 5000097 | | 3 | | | | 6 | | | | 1 | | | 9 | | | | | 8 | | | |
| | | 0011 | | | | 0110 | | | | 0001 | | | 1001 | | | | | 1000 | | | |
| | 0 | 0 | 1 | 1 | 0 | 1 | 1 | 0 | 0 | 0 | 1 | 1 | 0 | 0 | 1 | 1 | 0 | 0 | 0 | 0 |
| | | Calculate from BIN to DEC | | | | | | | | Cross Refer: Chart-2 | | | Cross Refer: Chart-3 | | | | bit 1 always 0 | | 0 means port0 or A, 1 then Port1 or B | |

In the example embodiment, of Symmetrix V-Max, as illustrated in Table 3, bits 63-36 may represent vendor specific identifications, and in this example a value 50000097 represents bits 63-36 that may be referred to as a Vender UID.

In this example embodiment, Bits 35-33, as illustrated in Table 3, may represent a country name where these Array boxes may be manufactured. In this embodiment, code CN may represent China, code EU may represent Europe, code US may represent the United States of America, and so on. In this example embodiment, this information may be added to a serial number of the array. In this embodiment, an abbreviation SN may be used to represent serial number of the array box. In this example embodiment, therefore, from Table 3, it may be deduced as follows:

bit 35 set=>>Origin: CN, SN: CN49xxxxxxx
bit 34 set=>>Origin: EU, SN: CK29xxxxxxx
bit 33 set=>>Origin: US, SN: HK19xxxxxxx In the following step, for the example embodiment, reference may be made to bits 32-26, as illustrated in Table 3, which may represent a model of the array box, and this information may be again added to the serial number. In this embodiment, bits 32 to 26 i.e., 0000010, may be recorded, and then a cross reference may be made with Table 4, below, that may assist in identifying an array type.

TABLE 4

| Bits 32 to 26 | VMAX Model Type Serial # | VMAX Model Type Comment |
|---|---|---|
| 0 0 0 0 0 1 0 | xxxx26xxxxx | VMAX or VMAX 20K |
| 0 1 1 0 0 0 0 | xxxx49xxxxx | VMAX-SE |
| 1 0 0 0 0 0 0 | xxxx57xxxxx | VMAX 40K |
| 1 0 0 0 1 0 0 | xxxx59xxxxx | VMAXe or VMAX 10K-959 |
| 1 1 1 1 1 0 0 | xxxx87xxxxx | VMAX 10K-987 |

In this example embodiment, cross referencing with Table 4, it may be easily concluded/deduced that, array type may be a VMAX 20K frame with serial number CN4926xxxxx, by referring to the associated values of bits 32 to 26.

In the next step for the example embodiment, for bits 25-10, reference may be made to the contents of Table 3 converted to decimal value, and a decimal value associated with bits 25-10 may be determined to be 1240. In this embodiment, output of the last 4 digits of serial number may be identified. It may be therefore concluded, for this example embodiment, that the serial number associated with an array may be CN492601240. Therefore in the example embodiment considered above, the complete serial number of an array box may be decoded as CN492601240.

In the next step, for the example embodiment, reference may be made to Bits 9-6 of Table 3, which may represent a director of an Array. In this embodiment, directors may be associated processors that may be running inside the arrays, and the director's code may be obtained from bits 9-6. For this example embodiment, it may be observed that bits 9 to 6 have an associated value 0110. In this embodiment, cross referencing a value of the bits with a binary breakout provided in Table 5 may provide a CPU letter. In the example embodiment, a processor letter for a director may be decoded to G.

TABLE 5

| Bits 9 through 6 binary breakout | CPU Letter |
|---|---|
| 0 | A |
| 1 | B |
| 10 | C |
| 11 | D |
| 100 | E |
| 101 | F |
| 110 | G |
| 111 | H |

In the next step for the example embodiment, reference may be made to bits 5-2 of Table 3, which may represent a director number of the directors. In this embodiment, it may be observed that bit 5 to 2 have a value of 0110. In this embodiment, cross referencing with the Table 6 below, a director number may be obtained. In this embodiment, on cross referencing a value of bits 5-2 with Table 6, an associated director number may be determined to be 7.

TABLE 6

| Bits 5 through 2 binary breakout | Director Number |
|---|---|
| 0 | 1 |
| 1 | 2 |
| 10 | 3 |
| 11 | 4 |
| 100 | 5 |
| 101 | 6 |
| 110 | 7 |
| 111 | 8 |
| 1000 | 9 |
| 1001 | 10 |
| 1010 | 11 |
| 1011 | 12 |
| 1100 | 13 |
| 1101 | 14 |
| 1110 | 15 |
| 1111 | 16 |

In the next step for the example embodiment, reference may be made to bits 1-0 of Table 3, which may represent a port number that may be present in the directors of an Array. In this embodiment, ports may be either frontend ports of an array or backend ports of an array. In this embodiment, it may be found that bit 1 has a value 0, as there may be no C or D ports for any director CPU, and bit 0 has an associated value of 0, which may refer to port 0 or A. In this embodiment, a bit may be set, and the bit may represent Port 1 or B. In this example embodiment, a value associated with bits 1-0 may be found to be 00, which therefore may mean that this may be either port 0 or port A. In this embodiment, it may be determined that port WWN may belong to VMAX 20K, and may have a serial number (SN) CN492601240, and array may have been made in China, with a WWN from director 7G and may have associated ports 0 or A.

As another example embodiment, consider a Passive HBA discovery, which may be decoding port WWN a system, for example, Qlogic. In this example embodiment, a Port WWN may be denoted as 20:00:00:e0:8b:05:05:04. In this embodiment, Emulex may use "2-IEEE 803.2 extended 48-bit ID" for its port WWN definition, and this format may be divided into 4 sections as shown below in Table 8.

TABLE 8

| 2 | 0:00 | 00:e0:8b | 05:05:04 |
|---|---|---|---|
| Section 1 | Section 2 | Section 3 | Section 4 |

For this example embodiment, as illustrated in Table 8, section 1, may identify a WWN as an extended format WWN. In this embodiment, section 2 may be a vendor specific code and may be used to identify specific ports on a node. In this example embodiment, a port number on HBA may be found to be 0. In this embodiment, section 3 may identify a vendor and section 4 may be a unique vendor-supplied serial number for the device.

In most embodiments, from zone information a zone name may be chosen for passive host discovery, and one of the following patterns shown below may be used
z_% h %
z_% h %_*
z_% h %_*_*
% h %_*,
wherein "h" denotes a host name. In these embodiments, based on these patterns, regular expression may be used to parse zone name IDs and a host name may be obtained. In an embodiment, a host name may be extracted, and the host name may be validated by using a domain name server (DNS) and an associated IP address of a host may be obtained from a DNS. In some embodiments, a host IP address may be checked in real time for availability, and this may be achieved by pinging a host name. In other embodiments, a user may add a new host zone naming pattern, but a user may have to add a corresponding regular expression. In certain embodiments passive HBA and Passive Array discovery may be based on zone members as disclosed previously.

Reference is again made to FIG. 2; Host H3 213 is a passive host that has not been discovered. For sake of illustration, this may be indicated by a dotted line connecting a host and a fabric, where a port may be represented as H3P1WWN, where H3 may indicate a host and P1 may indicate a port number. Similarly in FIG. 2, if Array2 234 has not been discovered and may be considered a passive array, as illustrated by a dotted line connecting an array and a fabric, array port may be represented as A2P1WWN. In some embodiments, host ports and array ports may be referred to as zone members.

In certain embodiments, zoning information may contain a zone, which may have the following information, a zone name, for example in FIG. 2, may be connected by the dotted lines Z3-H3-A2, and following zone members H3P1WWN and A2P1WWN. In some embodiments, by parsing a zone name Z3-H3-A2 that may have been recorded in zoning information, a host name for host H3 may be obtained. In some embodiments, once a host name is obtained, mapping a host name to a DNS may provide an IP address associated with Host H3. In one embodiment, a table maintaining the zoning information may be created by a SAN administrator. In another embodiment, once an IP address is obtained from a DNS, a HBA (H2P1WWN) and AFE (A2P1WWN) may be decoded using for example vendor specific algorithms as disclosed above. In further embodiments, other algorithms may also be used to encode and decode zoning information that may not have been described herein and those algorithms fall within the scope of the present disclosure. In certain embodiments, a passive host, a passive HBA and a Passive Array may be obtained and displayed to a user, providing end-to-end information about a SAN environment.

Figure 3:
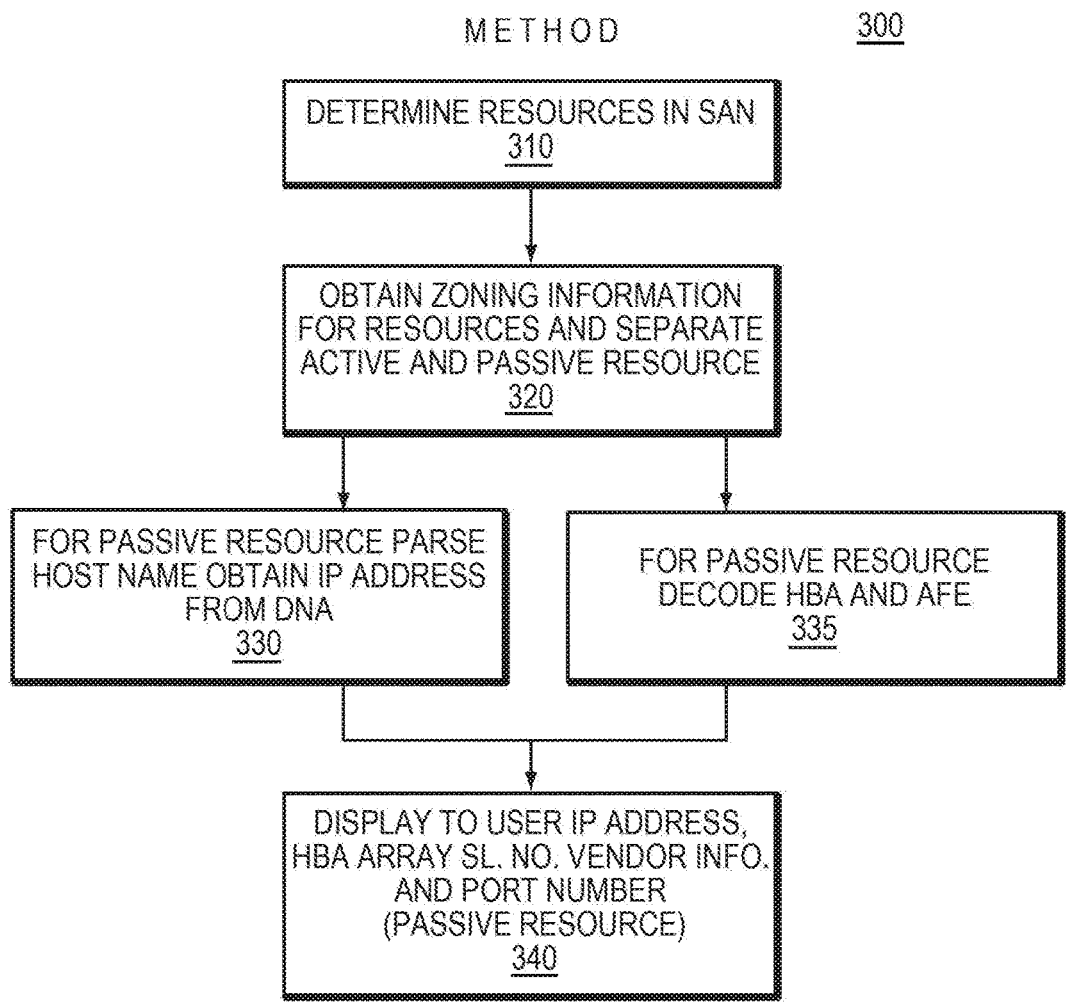
FIG. 3 illustrates exemplary methodology 300 illustrating the discovery of passive resources in a SAN, in accordance with an embodiment of present disclosure.

Reference is now made to the example embodiment of FIG. 3 that illustrates an exemplary method of providing a virtual environment display of the passive resource in a SAN environment. In the embodiment of FIG. 3, resources in a SAN may be determined (Step 310), which includes active and passive resources. Zoning information for the active resources and passive resources may be obtained (step 320). For the passive resources that have been identified in the SAN, the zone name may be obtained from the zoning information, which may then be parsed to obtain the host name (Step 330). Once the host name is obtained, a corresponding IP address for the host may be obtained from the DNS for all the passive resources (Step 330). For each of the zone names the zone members may be decoded using vendor specific algorithms to obtain information on the HBA, Array Serial Number, Vendor Information and Port Numbers for all passive resources (Step 335) in a parallel step. It should be noted that Step 335 may be performed separately in one embodiment. Once the required information with respect to the passive resources may be obtained, the user may be presented with a virtualization of the passive resources in the SAN environment (Step 340).

In one embodiment, a list of active resources may be displayed to a user by means of a management tool (which is not discussed in detail herein.) In certain embodiments, a number of network management tools may be used to display resources to a user, and such tools capable of displaying the active resource fall within the scope of the present disclosure. In certain other embodiments, tools may not be capable of discovering passive resources in a SAN and hence a user may not have any information with regards to passive resources in the SAN.

In certain embodiments, zoning information may be maintained in a fabric or a switch. In a further embodiment, zoning information may contain information on zone names and zone members. In a further embodiment, from zoning information all active resources may be identified and these active resources may be displayed to an end user.

In an example embodiment, a management tool, such as a software management tool, network management tool, may be used to obtain and display information on all active resources and passive resources in a SAN. In some embodiments, information that may be determined may include the following, but may not be limiting to, IP Address of a host, HBA Array S1. NO., vendor information, and port number. In certain embodiments, this information may provide a complete visualization of the SAN to an end user.

Figure 4:
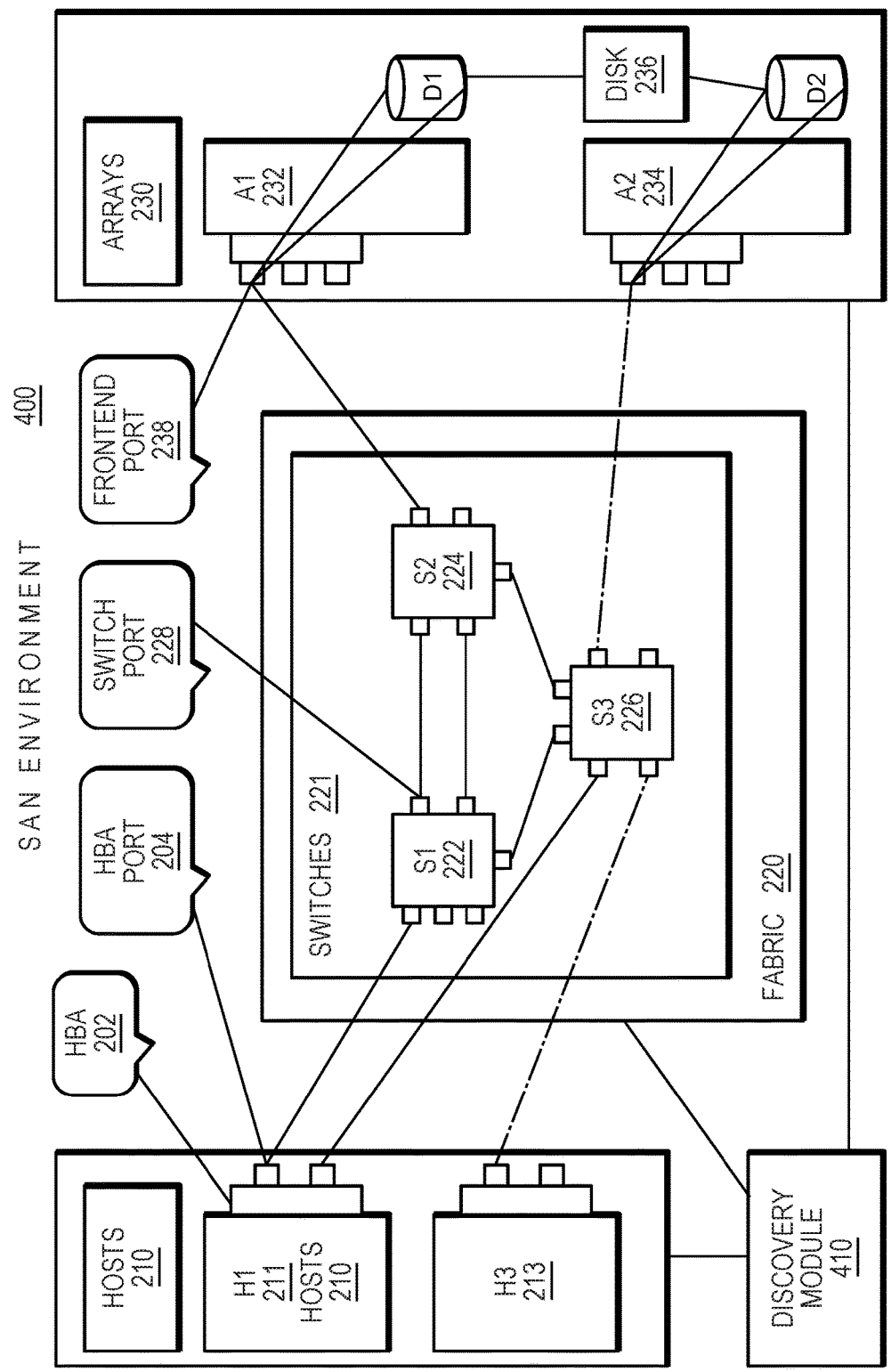
FIG. 4 is an exemplary apparatus 400 in accordance with an embodiment of the present disclosure.

FIG. 4 illustrates an exemplary embodiment of an apparatus 400 that may contain a module that is capable of performing/executing various embodiments of the disclosure made with respect to FIGS. 1-3. In FIG. 4, host, fabric and Array may be similar to the components indicated in FIG. 2 and carry same reference numerals. In one embodiment, entire process of identifying and classifying passive resources and displaying a passive resource may be in a preferred management tool may be performed by a discovery module, such as discovery module 410 of FIG. 4. In an example embodiment, a passive host discovery module, such as for example passive host discovery module 410 of FIG. 4 may be coupled to hosts, fabric and arrays, and may be part of a management tool, and the module may be configured to process zoning information to obtain information about passive resources and may be configured to then display passive resources to an end user.

As will be appreciated by one skilled in the art, aspects/embodiments of the present disclosure may be embodied as a system, method or computer program product. Accordingly, aspects/embodiments of the present disclosure may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, aspects/embodiments of the present disclosure may take the form of a computer program product embodied in one or more computer readable medium(s) having computer readable program code embodied thereon.

Any combination of one or more computer readable medium(s) may be utilized. In one embodiment, computer readable medium may be a computer readable program code or a computer readable storage medium. In a further embodiment, a computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The methods and apparatus of this disclosure may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 1, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. FIG. 1, which may have Program Logic embodied on a computer-readable medium as shown, and wherein the Logic is encoded in computer-executable code configured for carrying out the reservation service process of this invention and thereby forming a Computer Program Product.

Program code embodied on a computer readable medium may be transmitted using any appropriate medium, including but not limited to wireless, wireline, optical fiber cable, RF, etc., or any suitable combination of the foregoing.

The logic for carrying out the method may be embodied as part of the system described below, which is useful for carrying out a method described with reference to embodiments shown in, for example, FIG. 3 and FIG. 4. For purposes of illustrating the present disclosure, the disclosure is described as embodied in a specific configuration and using special logical arrangements, but one skilled in the art will appreciate that the device is not limited to the specific configuration but rather only by the claims included with this specification.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects/embodiments of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For purposes of illustrating the present invention, the invention is described as embodied in a specific configuration and using special logical arrangements, but one skilled in the art will appreciate that the device is not limited to the specific configuration but rather only by the claims included with this specification.

What is claimed is:

1. A method for managing a storage area network (SAN), the method comprising determining a plurality of resources within the SAN, the SAN comprising at least one or more host, a fabric and at least one or more arrays, wherein the fabric comprises at least one or more switches, wherein the at least one or more switches comprises a zoning information table, and wherein the at least one or more arrays further comprises a storage, and each switch comprises at least one switch port; at least one of the one or more switches is coupled to a host bus adapter (HBA) port, the HBA port being associated with a host, and a first unique identity is associated with the HBA port; at least one of the switch ports is coupled to an array frontend (AFE) port, the AFE port being associated with at least one of the one or more arrays, and a second unique identity is associated with the AFE port, the second unique identity associated with the AFE port being different from the first unique identity associated with the HBA port;

determining, based at least partly on the zoning information table, a passive resource physically resent in the SAN and not having been previously discovered in the SAN, the passive resource identified from the plurality of resources comprising active resources and passive resources in the SAN, wherein the active resources being physically Present in the SAN and discoverable in the SAN using protocols, wherein the determining, based at least partly on the zoning information table, the passive resource in the SAN, includes extracting a first and second port World Wide Name (WWN) from the zoning information table and decoding at least one of the first and second port WWN to identify the passive resource, wherein the first port WWN is the first unique identity associated with the HBA port, wherein the second port WWN is the second unique identity associated with the AFE port; and displaying to a user virtual information of the SAN, wherein the virtual information comprises the passive resource and attributes associated with the passive resource.

2. The method as claimed in claim 1, wherein the zoning information table comprises a plurality of zones, and each of the plurality of zones comprises a zone name and a plurality of zone members; and the zone member being classified by the first unique identity associated with the HBA port and the second unique identity associated with the AFE port.

3. The method as claimed in claim 2, wherein the zoning information table further comprises a one-to-one mapping of the first unique identity associated with the HBA port and the second unique identity associated with the AFE port.

4. The method as claimed in claim 2, further comprising decoding the plurality of zone members to obtain a passive HBA information and a passive array information associated with the host; parsing the zone name to obtain a passive hostname associated with the host; and passing the passive hostname to a DNS to obtain an IP address associated with the host.

5. The method as claimed in claim 4, wherein the passive hostname, the passive HBA information and the passive array information are provided to be displayed.

6. An apparatus for managing a storage area network (SAN), the apparatus comprising at least one processor and a discovery module runnable on the at least one processor, the discovery module configured for determining a plurality of resources within the SAN, the SAN comprising at least one or more hosts, a fabric and at least one or more arrays, wherein the fabric comprises at least one or more switches, wherein the at least one or more switches comprises a zoning information table, and wherein the at least one or more arrays further comprises a storage, and each switch comprises at least one switch port; at least one of the one or more switches is coupled to a host bus adapter (HBA) port, the HBA port being associated with a host, and a first unique identity is associated with the HBA port; at least one of the switch ports is coupled to an array frontend (AFE) port, the AFE port being associated with at least one of the one or more arrays, and a second unique identity is associated with the AFE port, the second unique identity associated with the AFE port being different from the first unique identity associated with the HBA port;

determining, based at least partly on the zoning information table, a passive resource physically resent in the SAN and not having been previously discovered in the SAN, the passive resource identified from the plurality of resources comprising active resources and passive resources in the SAN, wherein the active resources being physically present in the SAN and discoverable in the SAN using protocols, wherein the determining, based at least partly on the zoning information table, the passive resource in the SAN, includes extracting a first and second port World Wide Name (WWN) from the zoning information table and decoding at least one of the first and second port WWN to identify the passive resource, wherein the first port WWN is the first unique identity associated with the HBA port, wherein the second port WWN is the second unique identity associated with the AFE port; and displaying to a user virtual information of the SAN, wherein the virtual information comprises the passive resource and attributes associated with the passive resource.

7. The apparatus as claimed in claim 6, wherein the zoning information table comprises a plurality of zones, and each of the plurality of zones comprises a zone name and a plurality of zone members; and the zone member being classified by the first unique identity associated with the HBA port and the second unique identity associated with the AFE port.

8. The apparatus as claimed in claim 7, wherein the zoning information table further comprises a one-to-one mapping of the first unique identity associated with the HBA port and the second unique identity associated with the AFE port.

9. The apparatus as claimed in claim 7, wherein the discovery module is further configured for decoding the plurality of zone members to obtain a passive HBA information and a passive array information associated with the host; parsing the zone name to obtain a passive hostname associated with the host; and passing the passive hostname to a DNS to obtain an IP address associated with the host.

10. The apparatus as claimed in claim 9, wherein the passive hostname, the passive HBA information and the passive array information are provided to be displayed.

11. A computer program product for managing a storage area network (SAN), the computer program product being tangibly stored in a non-transient computer readable medium and including machine executable instructions, the machine executable instructions, when being executed, causing a machine for determining a plurality of resources within a SAN, the SAN comprising at least one or more hosts, a fabric and at least one or more arrays, wherein the fabric comprises at least one or more switches, wherein the at least one or more switches comprises a zoning information table, and wherein the at least one or more arrays further comprises a storage, and each switch comprises at least one switch port; at least one of the one or more switches is coupled to a host bus adapter (HBA) port, the HBA port being associated with a host, and a fir unique identity is associated with the HBA port; at least one of the switch ports is coupled to an array frontend (AFE) port, the AFE port being associated with at least one of the one or more arrays, and a second unique identity is associated with the AFE port, the second unique identity associated with the AFE port being different from the first unique identity associated with the HBA port;

determining, based at least partly on the zoning information table, a passive resource physically present in the SAN and not having been previously discovered in the SAN, the passive resource being identified from the plurality of resources comprising active resources and passive resources, wherein the active resources being physically present in the SAN and discoverable in the SAN using protocols, wherein the determining, based at least partly on the zoning information table, the passive resource in the SAN, includes extracting a first and second port World Wide Name (WWN) from the zoning information table and decoding at least one of the first and second port WWN to identify the passive resource, wherein the first port WWN is the first unique identity associated with the HBA port, wherein the second port WWN is the second unique identity associated with the AFE port; and displaying to a user virtual information of the SAN, wherein the virtual information includes the passive resource and attributes associated with the passive resource.

12. The computer program product as claimed in claim 11, wherein the zoning information table comprises a plurality of zones, and each of the plurality of zones comprises a zone name and a plurality of zone members; the zone member being classified by the first unique identity associated with the HBA port and the second unique identity associated with the AFE port; and further comprises a one-to-one mapping of the first unique identity associated with the HBA port and the second unique identity associated with the AFE port.

13. The computer program product as claimed in claim 12, further comprise decoding the plurality of zone members to obtain a passive HBA information and a passive array information of the host; parsing the zone name to obtain a passive hostname associated with the host, and passing the passive hostname to a DNS to obtain an IP address associated with the host.

14. The computer program product as claimed in claim 13, wherein the passive hostname, the passive HBA information and the passive array information are provided to be displayed.

* * * * *